Figure 1:
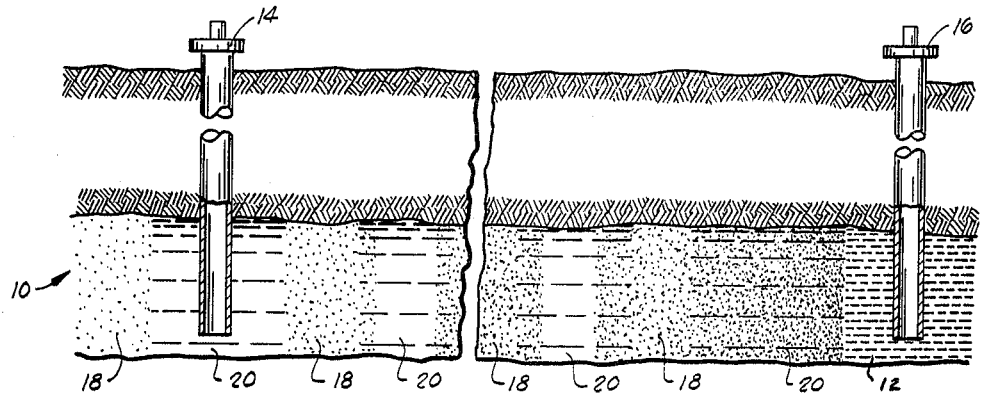

May 3, 1966  W. E. BRIGHAM ETAL  3,249,157
RECOVERY PROCESS FOR PRODUCING PETROLEUM

Filed June 6, 1963  2 Sheets-Sheet 1

INVENTORS
WILLIAM E. BRIGHAM,
JOHN N. DEW &
PHILIP W. REED
BY
David P. Cullen
ATTORNEY

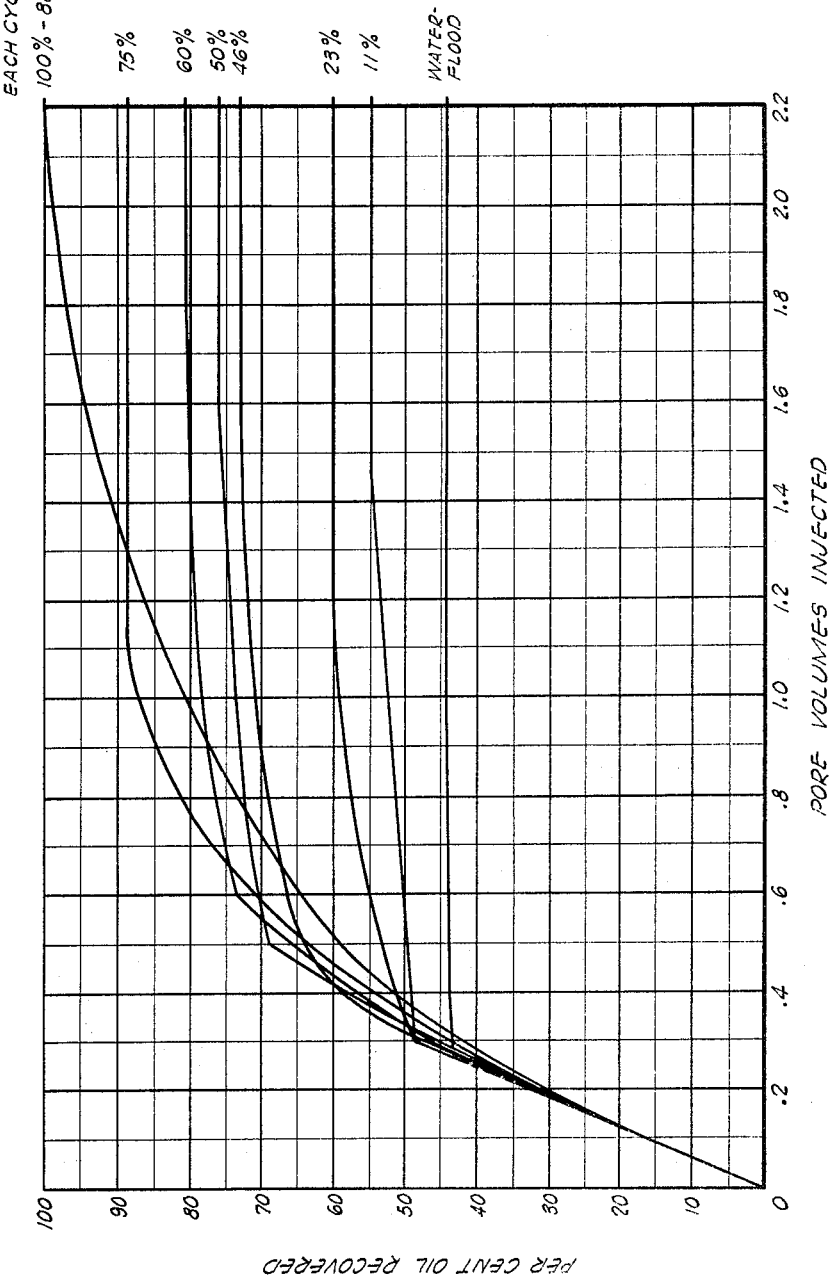

3,249,157
RECOVERY PROCESS FOR PRODUCING PETROLEUM
William E. Brigham, John N. Dew, and Philip W. Reed, Ponca City, Okla., assignors to Continental Oil Company, Ponca City, Okla., a corporation of Oklahoma
Filed June 6, 1963, Ser. No. 286,064
10 Claims. (Cl. 166—9)

This invention relates to the production of petroleum from a subterranean deposit. More particularly, the invention relates to an improved recovery technique whereby the efficiency of residual oil recovery is improved when miscible fluid displacement processes of recovery are employed.

In recovering petroleum from subterranean oil bearing strata, the petroleum is ordinarily first produced by exploiting the natural energy available in or adjacent the strata. This initial production is referred to as primary recovery and is generally effective to recover a maximum of only about 70 percent of the oil in the reservoir and frequently not more than about 10 to 20 percent of the reservoir oil. Because of the substantial amount of petroleum which cannot be removed from the reservoir by primary recovery methods, it is common practice to endeavor to recover as much of the residual oil as possible by secondary recovery methods. In general, these methods entail the introduction of artificial forces into the oil-bearing formation to force the oil into a producing well. The oil is then conveyed to the surface by the producing well.

One of the most effective recovery methods which has heretofore been practiced conissts of injecting into the formation a quantity of a fluid which is miscible with, or at least highly soluble in, the oil, so as to drive the oil in the formation toward a producing well which traverses the formation at some distance from the point of injection. An inert fluid which is either insoluble or only slightly soluble in the miscible fluid initially injected into the reservoir is frequently injected into the reservoir either simultaneously with or after the initially injected fluid in order to drive the initially injected fluid through the formation to the producing well. The use of a moving bank of miscible fluid to recover residual oil from subterranean formations has the marked advantage over such techniques as waterflooding and immiscible gas drives of relatively more efficiently displacing the oil from that portion of the formation traversed by the moving bank. The amount of oil left in place as a result of surface tension and capillary action is substantially reduced when a so-called miscible drive technique is used.

Fluids which can be used to miscibly displace oil from the reservoir by secondary recovery methods include, but are not limited to, gaseous and liquified butane and propane, liquified petroleum gas (L.P.G.), acetone, propyl alcohol, dioxane, carbon tetrachloride and ethane. Non-hydrocarbon fluids miscible with, or highly soluble in, the oil at relatively higher pressures can also be used and include carbon dioxide, hydrogen sulphide, nitrous oxide and sulphur dioxide. Carbon dioxide in particular has been used as a non-hydrocarbon drive fluid. The inert, immiscible, secondarily injected fluids which have been employed to drive the initially injected miscible fluid through the reservoir include, but are not limited to, water, nitrogen, air, natural gas and methane. A water drive is most frequently employed.

Although recovery by miscible displacement frequently is effective to recover substantially all of the oil in the portion of the reservoir contacted by the injected miscible fluid, the high mobility in the reservoir of commonly used miscible fluids results in undesirable fingering or channelling in the formation and poor sweep efficiency (percent of the total reservoir volume contacted by the miscible flood) as compared to that obtained when waterflooding is employed. Thus, the total amount of oil recovered from the entire formation may not be substantially higher than that which would be recovered using the less expensive waterflood, with the result that waterflooding is still probably the more commonly used procedure.

It has been recognized that reduction of the mobility of the fluids injected into the reservoir increases sweep efficiency with a resulting increase in the area of the reservoir contacted by injected fluid. This increase may be realized by the injection with the miscible fluid of water or other substantially immiscible liquids which serves to reduce the permeability of the formation to gas or miscible driving fluids less viscous than water, and thus reduce the total mobility of the injected fluids. It is believed that, in order to obtain the greatest reduction in the mobilities of the driving fluids (as in systems where a gas miscible with the oil is injected, followed by or mixed with, water) without substantial sacrifice in displacement efficiency, the velocities in the formation of the two injected fluids should be the same. In order to accomplish this, certain ratios of the injected volumes of miscible and immiscible fluids have heretofore been prescribed. Absent the use of such prescribed volumetric injection ratios, it was believed that either (a) the immiscible fluid would move ahead of the miscible fluid, and the result would be analogous to that obtained with a simple waterflood secondary recovery, or (b) the miscible fluid would move ahead of the immiscible liquid and the poor sweep efficiency which is characteristic of a miscible gas or low viscosity miscible liquid drive would result. The relative volumes of the two injected fluids which should be injected to achieve equal relative velocities of each of the fluids have been determined from a knowledge of the relative permeabilities of the formation of the two fluids, the viscosities of the fluids and the saturation established in the region of simultaneous flow. The following equations have heretofore been accepted, for example, as valid for the purpose of calculating the relative volumetric amounts of a miscible fluid and water which should be injected to achieve equal velocity in the formation:

(1) Relative velocity of water=

$$\frac{k_{rw}}{\mu w}\left(\frac{1}{S_w - S_{wi}}\right)$$

(2) Relative velocity of miscible fluid=

$$\frac{k_{rE}}{\mu g}\left(\frac{1}{1 - S_w}\right)$$

where
$k_{rw}$ = relative permeability to water
$k_{rg}$ = relative permeability to the miscible fluid
$\mu w$ = viscosity of water
$\mu g$ = viscosity of miscible fluid
$S_{wi}$ = initial water saturation
$S_w$ = saturation to water behind the flood front Since the relative velocities in Equations 1 and 2 are premised to be equal, and since the relative permeabilities ($k_{rw}$ and $k_{rg}$) are functions of the water saturation ($S_w$), the equations can be solved by trial-and-error by assuming various water saturations until the equations are equal. Then, at equal relative velocities, the relative volumes of water and miscible fluid to be injected are:

(3) Relative volume of water = $S_w - S_{wi}$
(4) Relative volume of miscible fluid = $1 - S_w$ Using these formulae to determine the amounts of the miscible fluid and immiscible liquid which should be injected, it is found that the volume of the immiscible liquid injected should be equal to or greater than the volume of miscible fluid injected, and in some cases, the solution of the equations indicates that as many as 10 volumes of the immiscible liquid should be injected for each volume of the miscible fluid.

We have now determined that, unexpectedly, the injection of immiscible liquid and miscible fluid in prior art volumetric ratios of from about 1:1 to about 10:1 does not result in the most efficient secondary recovery of oil from a reservoir. The formulae cited above do not appear to enable the volumetric fluid injection ratios necessary to result in equal fluid velocities in the formation to be correctly determined. Therefore, when injection ratios are used which are within the range calculated, substantially lower recoveries of oil result than predicted.

It has been determined in the research and work culminating in the present invention that a substantial improvement in the overall recovery efficiency of miscible drive secondary recovery processes can be realized by injecting into the formation in alternate slugs of certain specific sizes and in certain specific volumetric ratios, a miscible fluid and an immiscible fluid. Thus, data from laboratory and field tests indicate that, when relatively small slugs of the two fluids described are alternately injected in a ratio of between about 1 volume of immiscible liquid to between about 1 and about 10 volumes of the miscible fluid, a substantial increase in the amount of oil recovered is realized. It will be noted at once that the range of volumetric injection ratios which are advocated are quite different from those previously utilized. In addition, the size of the individual slugs should not exceed about 2 percent of the hydrocarbon pore volume of the reservoir.

Before proceeding further with the description of the invention, it is desirable to define the terms "miscible" and "immiscible" as they are used herein and in the claims of this application. The term miscible is used to characterize a fluid which is relatively soluble in the fluid which is displaced in the reservoir immediately ahead of the two fluids injected into the reservoir in alternate slugs and in the volumetric ratios taught by the present invention. In many instances, this displaced fluid will be the in-place hydrocarbons occurring naturally in the subterranean formation. However, it is sometimes desirable for economic reasons to initially inject a relatively large amount of carbon dioxide or an extrinsic hydrocarbon material, such as liquified petroleum gas, which then forms an intermediate bank between the reservoir hydrocarbons and the two fluids injected in alternate slugs according to the present invention. In such instances, the initially injected extrinsic hydrocarbon or carbon dioxide is the fluid which is said to be displaced immediately ahead of the two fluids (the miscible and immiscible fluids) injected in alternate slugs in a volumetric ratio as prescribed by the present invention, and it is in this displaced fluid that the miscible fluid of this invention must then be relatively highly soluble. Moreover, in these instances, the miscible fluid of the invention need not be miscible or soluble in the naturally occurring hydrocarbons in the formation, since such miscibility will be characteristic of the relatively large intermediate bank of initially injected fluid.

The immiscible fluid which is contemplated by the present invention is a liquid which is insoluble or only slightly soluble in the in-place reservoir hydrocarbons and in the miscible fluid characterized above. Water is preferably employed as the immiscible liquid.

From the foregoing discussion of the solubility characteristics of the miscible and immiscible fluids of the invention, it will have become apparent that the adjectives miscible and immiscible as used herein are intended to encompass within their definition, states of a high degree of solubility and relatively slight or low solubility, respectively. Preferably, the miscible fluids contemplated by the invention have a solubility under reservoir conditions of at least 30,000 p.p.m. in the fluid displaced in the reservoir immediately ahead of the alternately injected miscible and immiscible fluids, whether such displaced fluid is the hydrocarbon material occurring naturally in the reservoir, carbon dioxide or an extrinsic hydrocarbon initially injected in a large bank for improving the economy of the process. The immiscible liquids which are injected in alternate slugs with the miscible fluid preferably have a solubility in the miscible fluid and in the naturally occurring reservoir hydrocarbons which does not exceed $\frac{1}{10}$ the solubility of the miscible material in the reservoir hydrocarbons, such solubilities being determined under existing reservoir conditions. It is, in every case, essential that two phases be developed in the formation by the adjacent slugs of miscible and immiscible fluids.

To more specifically summarize one method for practicing the process of the present invention, there is injected into the formation from a suitable injection well, a miscible fluid, as hereinbefore defined, in a volumetric amount which is less than about 2 percent of the hydrocarbon pore volume of the formation, and is at least twice the volumetric displacement of that portion of the well bore which traverses the formation. The initially injected slug of miscible fluid is followed by a slug of immiscible liquid having a volume which is between about 10 percent and 100 percent the volumetric size of the slug of initially injected miscible fluid. In other words, the volumetric injection ratio of the immiscible to miscible fluids is from about 1:1 to about 1:10. There is no criticality attached to the choice of initially injected fluid, since in an alternate method of practicing the invention, the immiscible liquid may be the first of the two fluids which is injected. In any event, however, a ratio between miscible and immiscible fluids of from about 1:10 to 10:1 should be used.

The alternate injection of the slugs of miscible and immiscible fluids may be continued throughout the life of the flood. In many instances, however, economic considerations will make it preferable to interrupt the injection of alternate slugs of the miscible and immiscible fluids in the manner described and follow the banks of these fluids with water or other driving fluid to complete the recovery process. The cost of the initially injected fluids, the formation characteristics and other factors well-known to those skilled in the art will determine the optimum point for terminating alternate slug injection. In some cases, it may be desirable to initially inject one miscible fluid in alternate slugs with a suitable immiscible liquid and then later switch to the injection of a second miscible fluid which is miscible with the first miscible fluid, and then alternate the injection of slugs of this material with the slugs of immiscible liquid.

From the foregoing discussion of the invention, it will be apparent that it is a primary object of the invention to provide an improved technique for recovering residual oil from a subterranean formation.

A further and more specific object of the invention is to provide an improved method of miscibly displacing hydrocarbons from a subterranean formation in a recovery process.

An additional object of the invention is to increase the amount of oil which can be recovered from an oil containing reservoir when a fluid which is miscible with the oil is used for displacing the oil toward a production well which traverses the reservoir.

Another object of the invention is to provide a recovery process for producing oil from a partially depleted subterranean oil bearing formation, by which process as high as about 95 percent of the oil remaining in the formation can frequently be recovered.

Other objects and advantages of the invention will become apparent as the following detailed disclosure of the invention is read in conjunction with a perusal of the accompanying drawings which illustrate the invention.

In the drawings:

FIGURE 1 is a schematic diagram illustrating the manner in which the alternate slugs of miscible and immiscible fluids are passed through the reservoir from an injection well to a producing well in practicing one embodiment of the invention.

Figure 2:
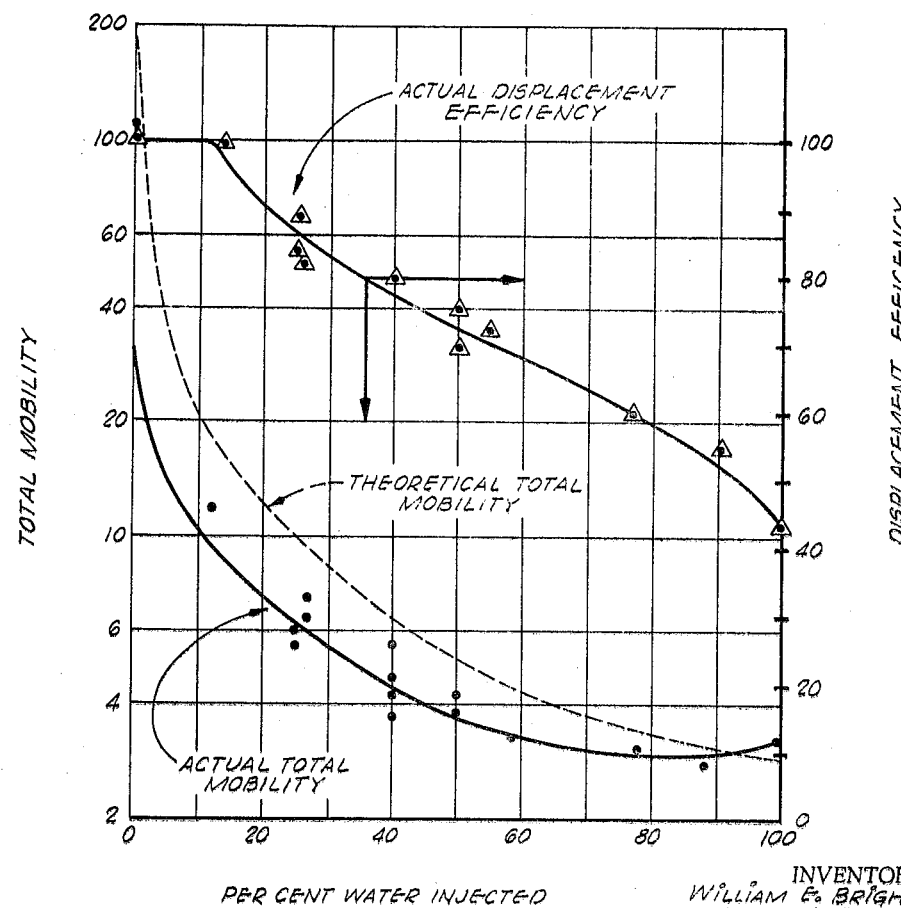

FIGURE 2 is a graph illustrating the difference between (a) the actual or true total mobility of miscible and immiscible fluids when various percentages of the fluids are alternately injected into a Berea sandstone core, and (b) the theoretical total mobility which is yielded by previously accepted formulae heretofore used to calculate the optimum volumetric injection ratios of such fluids. There is also depicted in the graph of FIGURE 2, a curve representing the variation in the displacement efficiency of the fluids injected in accordance with this invention as various percentages of the fluids are injected. The total mobility curves are plotted using a logarithmic ordinate scale since total mobility varies exponentially as the volumetric injection ratios; the displacement efficiency curve, on the other hand, is plotted using a linear scale.

FIGURE 3 is a graph wherein the percent of residual oil recovered is plotted against total hydrocarbon pore volumes of fluid injected for several different miscible to immiscible fluid injection ratios.

In describing one method of practicing the process of the present invention, reference will initially be made to FIGURE 1 which depicts a subterranean oil bearing reservoir or formation 10 which contains residual hydrocarbons 12 which it is desired to recover by a secondary recovery process. The formation 10 is traversed by an injection well 14 and one or more production wells 16 which are horizontally spaced from the injection well.

Initially, in one method of practicing the present invention, a quantity or "slug" of a miscible fluid 18 is injected through the injection well 14 into the formation 10. As has been previously indicated, such fluids include, but are not limited to, gaseous and liquified butane, propane, carbon dioxide, liquified petroleum gas (L.P.G.), acetone, propyl alcohol, dioxane, hydrogen sulphide, carbon tetrachloride and sulphur dioxide. As will be subsequently explained, in a slightly different method of practicing the invention, the miscible fluid used may also include natural gas and methane gas. Although these materials are not miscible with the naturally occurring reservoir hydrocarbons, they are miscible with L.P.G. and carbon dioxide which may be injected in a relatively large bank ahead of the miscible and immiscible fluids of the invention, and thus may constitute the fluid displaced immediately ahead of the alternate fluid slugs of the invention rather than the in-place hydrocarbons.

After the miscible fluid has been injected into the formation in a volume within the limits above prescribed, a slug of an immiscible liquid 20 is injected into the formation. This liquid is normally water and may be either saline, fresh, hard or soft water, depending, in most instances, upon the supply available at lowest cost.

The volume of the individual slugs of the miscible fluid 18 and liquid 20 which are injected into the reservoir is of considerable importance in the practice of the present invention. We have found that for slug volumes of the miscible fluid of up to 2 percent of the total hydrocarbon pore volume of the formation, the portion of the oil in the formation which is recovered is substantially independent of the size of the slug. Above this size, however, the total oil recovered from the formation for a given total amount of injected fluids decreases. The maximum amount of the miscible fluid which it is desirable to inject in each individual slug is therefore about 2 percent of the hydrocarbon pore volume of the formation, and is preferably from about .05 percent to about 0.5 percent of the formation hydrocarbon pore volume. The volumetric size of the slugs of immiscible liquid which are injected alternately with the slugs of miscible fluid are in no case larger than the miscible fluid slugs. Therefore, the 2 percent of the hydrocarbon pore volume desirable upper limit which applies in the case of the sizes of the slugs of miscible fluid also represents the desired maximum size of the slugs of the immiscible liquid which are injected.

The smallest permissible size of the slugs of either fluid which are injected into the formation is determined primarily by the desirability of avoiding vertical stratification of the miscible and immiscible fluids in the formation adjacent the well bore, and in that portion of the well bore which traverses the formation. It has been determined that a minimum slug size equal to twice the volumetric displacement of that portion of the well bore which traverses the formation being flooded should be used in the case of each slug of both the miscible and immiscible fluid. Preferably, the volumes of each fluid which are injected in each alternate injection are at least ten times the volumetric displacement of that portion of the well bore which traverses the formation.

In general, a total volume of miscible fluid equal to at least about 2 percent of the formation hydrocarbon pore volume should be injected during the recovery procedure, and preferably an amount equal to from about 5 percent to about 15 percent of the hydrocarbon pore volume should be utilized. Moreover, when the minimum total amount is utilized, preferably it is injected in at least about 10 slugs although the process is operative when either a larger or a smaller number of slugs is employed.

The volumetric ratio of the injected slugs of miscibel fluid 18 to the injected slugs of immiscible liquid 20 should be between about 1:1 and about 10:1. Preferably, a ratio of from about 9 volumes of miscible fluid to 1 volume of immiscible liquid to about 3 volumes of miscible fluid to 2 volumes of immiscible liquid is employed (9:1 to 3:2).

The alternate injection of the slugs of miscible and immiscible fluids, 18 and 20, respectively, is continued using the specified volumes and injection ratios until such procedure becomes no longer economic in view of the amount of oil being recovered. The alternate slug injection may then be followed by a straight water drive to recover from the formation the more expensive fluid used in the drive. In most instances where a hydrocarbon type miscible fluid, such as L.P.G. or methane, is employed, the alternate injection of slugs totaling in volume about 15 percent of the formation hydrocarbon pore volume is usually sufficient to obtain the maximum benefit which may be realized from the practice of the invention. When carbon dioxide is the miscible fluid employed, the total volume of carbon dioxide to be injected depends on the cost of the carbon dioxide, the value of the oil and other economic factors. However, the total volume of carbon dioxide should generally not exceed about 30 percent of the hydrocarbon pore volume of the formation. The total amount of water or other drive fluid injected after completion of the alternate slug injection will depend, as in normal waterflooding operations, entirely on economic factors, such as injection costs, lifting costs, etc.

At this point, it is believed that comprehension of the scope of the invention, and an appreciation of some possible variations in its practice will be enhanced by briefly describing some further embodiments of the invention. As has already been suggested, no criticality is deemed to attach to the order of injection of the slugs of miscible and immiscible fluids into the formation. Thus, either the miscible or immiscible fluid may be injected at the outset of the process. It has also been previously indicated that prior to commencing the injection of alternating slugs of miscible and immiscible fluids into the reservoir, it may, in some instances, be desirable to interpose a relatively large bank of a fluid which is miscible with the reservoir hydrocarbons between such hydrocarbons and the injection well. Typical of such pre-injected fluids are carbon dioxide, L.P.G. and rich gas (methane gas containing appreciable quantities of ethane and/or propane).

Since these identical materials may also be used as the miscible fluid used in practicing the alternate slug injection procedure of the invention, it is desirable to clearly establish the difference obtaining between the latter use of the materials and their use for forming a relatively large, initially injected bank which is positioned between the alternate slugs of the invention and the naturally occurring formation hydrocarbons. When one of these materials miscible with the formation hydrocarbons is initially injected for the purpose of forming a large intermediate bank of the type described, the quantity of material injected will often be higher than the 2 percent of the formation hydrocarbon pore volume which is the preferred maximum volume of the slugs used in practicing this invention. A more general characteristic of this procedure, however, is the injection behind the initially injected material of a fluid which is miscible in the initially injected fluid, but immiscible in the naturally occurring hydrocarbons of the reservoir. For example, a large amount of L.P.G. may be initially injected, followed by a slug of methane having a volume of less than 2 percent of the formation hydrocarbon pore volume, followed by a slug of water and continuing with the alternate injection of slugs of methane and water, with such slugs being injected in the volumetric ratios prescribed by this invention. In this instance, the methane and water are the miscible and immiscible fluids used in practicing the invention as hereinbefore defined. At usually occurring reservoir conditions of tempearture and pressure, the methane is miscible with the L.P.G. displaced immediately ahead of the alternately injected slugs and thus conforms to the definition of the miscible fluid of the invention, even though the methane is not miscible in the hydrocarbons of the formation. Instead of L.P.G., the large volume of initially injected fluid may also be, but is not limited to, carbon dioxide and rich gas.

Yet another method of practicing the invention contemplates the injection of two or more alternate slugs of miscible and immiscible fluids in the slug size and volumetric ratio hereinbefore described, followed by the alternate injection of slugs of the immiscible fluid and a third fluid which is miscible with the initially injected miscible fluid and immiscible with the immiscible fluid. Preferably the slug sizes of the third fluid and its volumetric injection ratio with respect to the immiscible fluid are the same as in the case of the miscible and immiscible fluids initially injected in alternate slugs. An example of this procedure is the initial injection of a slug of water, followed by a slug of L.P.G. of between 1 and 10 times the volumetric size of the water slug, followed by several alternate slugs of water and L.P.G. in the same ratio, followed by another slug of water, followed by a slug of methane or natural gas and then continuing with alternate slugs of natural gas and water. Alternately, rich gas and water, or carbon dioxide and water, may constitute the fluids first injected in alternate slugs with the water being injected either initially or secondarily.

The temperatures and pressures normally employed in miscible fluid drive oil recovery processes are employed in practicing this invention. Usually, the temperature and pressure at which the miscible and immiscible fluids are injected and pass through the formation will be dictated by the character of the formation and the conditions prevailing therein. The fluids should be selected so that, at formation conditions of temperature and pressure, the required degree of solubility of of the miscible fluid in the fluid displaced ahead of alternately injected slugs will be achieved, and so that the immiscible liquid will remain in the liquid state during its traverse of the formation. In any event, there must always be two distinct phases developed by the miscible fluid and the immiscible liquid in the vicinity of the injection well. In the case of some miscible gases, such as carbon dioxide, which are characterized by a slight but nevertheless significant solubility in water, the amount of the miscible gas which is injected is preferably from about 10 to about 1000 times the amount which can dissolve in the injected water under reservoir conditions.

Both laboratory and field tests have demonstrated the superiority of the oil recovery method proposed by the present invention over prior art methods of recovery utilizing volumetric injection ratios outside the ranges taught herein. The precise mechanism by which the process of the present invention functions is not fully understood. It is believed, however, that in traversing the formation, the miscible and immiscible fluids merge and display little or no vertical stratification in the formation. In other words, before the fluids have proceeded far into the formation, the individual pore spaces of the formation rocks contacted by the fluids become partially saturated with the miscible fluid and partially saturated with immiscible liquid. This occurrence is schematically illustrated in FIGURE 1 of the drawings. The total mobility of the driving fluids is thus effectively lowered, the sweep efficiency is improved and no substantial decrease in displacement efficiency results.

Results obtained in comparative tests demonstrate that the predicted recovery is not obtained when the previously accepted formulae are used to determine the volumetric injection ratios of the two fluids, and that, unexpectedly, improved recovery is obtained when relatively small slugs of the two fluids are alternately injected in the previously rejected volumetric ratios taught by this invention.

The comparative tests to which reference has been made were run in glass bead pack cores and in Berea sandstone cores. Table I shows the conditions obtaining and the results realized when a number of recovery runs were made using Berea sandstone cores and laboratory injection apparatus to simulate actual reservoir conditions. The missible fluid employed was butane and the immiscible liquid was water. The cores were prepared by thoroughly cleaning them with successive washes of alcohol and pentane, followed by drying with air. The cores were then disposed horizontally and saturated with water, followed by the injection of from 8 to 10 pore volumes of oil to achieve residual water saturation of the cores. Alternate slugs of butane and water were then injected under the conditions specified in Table I.

Table I

[BEREA SANDSTONE CORE-CROSS SECTIONAL AREA 19.78 CM.²—LENGTH 30.3 CM.]

| Recovery Run | ΔP, p.s.i.g., Butane Injection | ΔP, p.s.i.g., H₂O Injection | Injection [1] Ratio Percent Butane | Average [2] Injection Rate | Irreducible Water Saturation | Irreducible Oil Saturation | $K_a$, Permeability to air | Percent H.C.P.V.[3] Injected Per Cycle | Displacement Efficiency [4] |
|---|---|---|---|---|---|---|---|---|---|
| 1 | 1.0 | -------- | 100 | .0088 | 35.1 | 64.9 | 169 | -------- | 100 |
| 2 | -------- | 59.0 | [5] 0 | .0075 | 37.7 | 62.3 | 98 | -------- | 44.3 |
| 3 | 16.3 | 39.5 | 88 | .0081 | 37.8 | 62.2 | 96 | 2 | 100 |
| 4 | 55.5 | 58.5 | 75 | .0160 | 36.9 | 63.1 | 105 | 2 | 82.3 |
| 5 | 25.3 | 38.0 | 75 | .0092 | 38.5 | 61.5 | 100 | 2 | 83.6 |
| 6 | 22.0 | 20.3 | 75 | .0086 | 37.9 | 62.1 | 101 | 2 | 90.9 |
| 7 | 43.5 | 48.5 | 73 | .0153 | 37.2 | 62.8 | 110 | 2 | 73.5 |
| 8 | 23.0 | 22.8 | 69 | .0163 | 35.6 | 64.4 | 171 | 2 | 71.6 |
| 9 | 36.7 | 36.7 | 60 | .0081 | 37.6 | 62.4 | 110 | 2 | 80.5 |
| 10 | 34.5 | 33.5 | 50 | .0085 | 36.2 | 63.8 | 131 | 2 | 69.7 |
| 11 | 42.7 | 43.7 | 50 | .0086 | 37.0 | 63.0 | 102 | 4 | 73.6 |
| 12 | 24.2 | 17.4 | 50 | .0074 | 37.4 | 62.6 | 110 | 8 | 65.1 |
| 13 | 45.0 | 45.0 | 46 | .0077 | 37.0 | 63.0 | -------- | 2 | 72.8 |
| 14 | 49.0 | 49.0 | 23 | .0077 | 38.4 | 61.6 | 118 | 2 | 60.1 |
| 15 | 60.3 | 60.3 | 11 | .0067 | 38.7 | 61.3 | 98 | 2 | 55.1 |

[1] Injection ratio equals volume of butane injected in each butane slug divided by the total volume of both slugs multiplied by 100.
[2] Average injection rate given in cubic centimeters per second.
[3] The total volume injected with the injection of each pair of alternate slugs in percent of the total hydrocarbon pore volume of the core.
[4] The displacement efficiency in core tests as percentage of the total oil in the core recovered.
[5] 100% H₂O.

From the data tabulated in Table I, it may be seen that considerably higher displacement efficiency was obtained when the injection ratio of miscible to immiscible fluid was between 1:1 and 10:1 than when the injection ratios were lower than 1:1. It will also be noted that when the volume of miscible fluid injected per slug exceeded 2 percent of the hydrocarbon pore volume of the formation, the total recovery of oil was decreased.

In tests run using the above described laboratory cores, it was found that when the volumes of water and butane injected were the optimum amounts calculated using Equations 1 and 2, a persistent breakthrough of the butane before the water occurred, indicating that the velocity of the butane in the cores was actually faster than that of the water. Moreover, none of the runs which were made using the volumetric injection ratios calculated by Equations 1 and 2 actually gave maximum displacement efficiency as predicted by the theory. For instance, in a run using a glass bead pack core 20.83 cm.² in cross-sectional area, 119 cm. in length and characterized by a permeability to air of 630 millidarcies, according to Equations 1 and 2, to obtain the maximum displacement efficiency, the injection ratio should be 23 percent butane and 77 percent water when these materials constitute the miscible fluid and immiscible liquid in use. However, when these two fluids were actually injected in this ratio into a core of this type, only about 90 percent of the oil was recovered from the core, a relatively low recovery from a glass bead core of this type as opposed to a formation rock core. At least 50 percent butane had to be injected before 100 percent displacement efficiency was realized in the glass bead core. In a Berea sandstone core having the dimensions described in Table I above, the optimum injection volumes predicted by Equations 1 and 2 are 45 percent butane and 55 percent water. However, injection of this ratio resulted in a displacement efficiency of only about 72 percent. For 100 percent displacement efficiency, at least 88 percent butane had to be injected (a slug ratio of about 7.5:1 butane to water).

As has been hereinbefore pointed out, it is generally recognized that when the mobilities of the injected or driving fluids are low, the areal coverage of the sweep and, thus, the total oil recovery is increased. Although in small laboratory cores, such as those used in the tests described above, no direct measurement of areal coverage is possible since all of the cores are swept out on each test run, the data do permit the total mobility of the injected fluids to be calculated by the use of Darcy's equation, which states that:

$$\text{Total Mobility} = \frac{100QL}{A\Delta P k_a}$$

wherein

Q is the average injection rate during the run in cubic centimeters per second,

L is the length of the core in centimeters,

A is the cross-sectional area of the core within a plane extending normal to the longitudinal axis of the core in square centimeters, ΔP is the total pressure drop across the length of the core in p.s.i.g., and $k_a$ is the permeability of the core to air in millidarcies.

The total mobilities which resulted when various ratios of water and butane were injected into the Berea sandstone cores used in the runs tabulated in Table I were calculated using Darcy's equation and these values are plotted on the graph illustrated in FIGURE 2.

The actual total mobilities resulting from the alternate injection of slugs having a volumetric size of less than 2 percent of the hydrocarbon pore volume of the core may be compared with the theoretical total mobilities which are predicated by Equations 1 and 2 to be attainable when various proportions of butane and water are injected. For convenience of comparison, these theoretical total mobilities for the Berea sandstone core are also plotted in FIGURE 2. It will be noted in comparing the two curves that, at substantially all butane to water ratios, lower total mobilities are obtained through the practice of the present invention than would be expected from the prior art theoretical predictions. Of particular interest is the fact that, in the practice of the present invention, the injection of only a relatively small proportion (about 10 percent) of water dropped the total mobility to 10. When the displacement efficiency curve is considered together with the actual total mobility curve, it is apparent that unexpectedly superior recovery is obtained when slugs of miscible and immiscible fluids are alternately injected in a ratio of from about 1:1 to about 10:1 and that optimum recovery is obtained when the slugs are injected in a ratio of from about 3:2 to about 9:1, miscible to immiscible fluid. FIGURE 3, wherein the percent of the residual oil recovered is plotted against total hydrocarbon pore volumes of fluid injected for several different miscible to immiscible fluid injection ratios, further confirms this optimum range of injection ratios.

In field tests of the present invention, alternate slugs of L.P.G. and water, followed by alternate slugs of rich gas (methane gas having a relatively high ethane content) and water, were injected through an injection well into a clean Lakota sand having an average porosity of 14 percent and an average permeability of 100 millidarcies. The average producing depth was 7,350 feet and the average bottom hole pressure at datum was 900 p.s.i.g. The net pay thickness of the formation was 9.5 feet and the irreducible water saturation was 23.6 percent. The viscosity of the oil was 0.55 centipoises at the original reservoir temperature of 180° F.

Originally in the same formation, only L.P.G. had been injected without alternate injections of water slugs. The L.P.G. had fingered in the reservoir and had broken through to the offsetting producing well in twelve months. Although the rich gas employed in field testing the present invention had a viscosity 3 to 5 times smaller than the viscosity of the L.P.G. originally injected into the formation, and therefore had a mobility considerably higher than the mobility of the L.P.G., the rich gas did not break through to the producing well when it was injected in alternate slugs with water at a pressure of 1200 p.s.i.g. The injection of alternate slugs of the rich gas and water was continued for two years at a high rate with no evidence of gas breakthrough. The gas to water volumetric injection ratio ranged during this time from 2:1 to 8:1 (gas volumes per volume of water). The average volume of the slugs of L.P.G. was about 0.4 percent of the hydrocarbon pore volume of the formation and that of the rich gas was about 0.8 percent of the hydrocarbon pore volume of the formation.

From the foregoing description, it will be apparent that the present invention provides a novel recovery method by which increased amounts of oil may be recovered from partially depleted subterranean oil reservoirs. The method requires no substantial alteration in apparatus previously employed for injecting liquids and gases into subterranean formations and may be easily practiced by those having average training and experience in miscible flood secondary recovery techniques.

Although the process of the invention has been described with a certain degree of particularity in order to convey, by example, a basic understanding of the invention sufficient to enable one of average skill in the art of petroleum production to practice the invention, it is to be expected that the specific conditions and ranges of some parameters herein described may be altered in some degree without departure from the basic principles underlying the invention. It is therefore intended that alterations and modifications which do not entail an abandonment of the basic concepts upon which the invention is bottomed shall be considered as circumscribed by the spirit and scope of the invention except as the same may be necessarily limited by the appended claims or reasonable equivalents thereof.

What is claimed is:

1. A method for increasing the amount of oil recovered from an oil bearing formation traversed by at least two wells, which method comprises:
    (a) injecting into said formation from one of said wells a fluid miscible with the fluid in the formation adjacent said one well; and
    (b) injecting into said one well a fluid which is substantially immiscible with said miscible fluid and with the naturally occurring hydrocarbons in said formation, the ratio of the miscible fluid to the immiscible liquid varying from about 3:2 to about 9:1 and the amount of either of said fluids which is injected into said formation at one continuous injection being between about 2 percent of the hydrocarbon pore volume of the formation and at least about twice the displacement of that portion of the bore of said one well which traverses the formation;
    (c) injecting into said one well a drive fluid sufficient to drive the oil through said formation and thereafter through a producing well.

2. The method defined in claim 1 wherein said immiscible fluid is a liquid.

3. The method in claim 2 wherein said liquid is water.

4. The method defined in claim 1 wherein said immiscible fluid is water and said miscible fluid is carbon miscible fluids into the reservoir through said injection an amount whch is from about 10 to about 1000 times the amount which will dissolve in the amount of water injected into the reservoir at reservoir conditions of temperature and pressure.

5. The method defined in claim 1 wherein said fluid miscible with the fluid in the formation adjacent said one well comprises liquified petroleum gas.

6. A secondary recovery process for producing hydrocarbons from a subterranean reservoir traversed by a producing well and an injection well comprising alternately injecting slugs of two mutually relatively immiscible fluids into the reservoir through said injection well to displace said hydrocarbons toward said producing well, one of which injected fluids is relatively miscible with the fluid displaced in the reservoir immediately ahead of said injected fluids, and the other of which fluids is relatively immiscible with the reservoir hydrocarbons, said injected fluids being injected in a volumetric ratio of from about 1.5 to about 9 volumes of the injected fluid which is relatively miscible with the fluid displaced in the reservoir immediately ahead of the injected fluids to the other injected fluid, said slug of each fluid injected into the reservoir having a volume not greater than about 2 percent of the hydrocarbon pore volume of the reservoir and not less than about twice the volumetric displacement of that portion of the well bore which traverses the formation, and injecting into said injection well a drive fluid sufficient to drive the oil through said formation and thereafter through said producing well.

7. The process defined in claim 6 wherein the volume of each slug of fluid injected is equal to from about 0.05 percent to about 0.5 percent of the hydrocarbon pore volume of the reservoir.

8. The process defined in claim 6 wherein the alternate injection of slugs is continued until a volume of said fluid substantially miscible with the fluid displaced in the reservoir immediately ahead of the injected fluid is injected which is equal to from about 2 percent to about 20 percent of the hydrocarbon pore volume of the reservoir.

9. A process for recovering hydrocarbons from a subterranean formation traversed by an injection well and a producing well which comprises:
    (a) injecting into said formation through said injection well, a fluid which is miscible in the naturally occurring hydrocarbons of the formation;
    (b) injecting into said formation at least one slug of a second fluid which is miscible in the initially injected fluid and immiscible with the naturally occurring hydrocarbons of the reservoir;
    (c) injecting into the formation a liquid which is immiscible with the second injected fluid and with the naturally occurring hydrocarbons of the reservoir, the ratio of the miscible fluid to immiscible liquid varying from about 3:2 to about 9:1 and the amount of either of said second fluid and said immiscible liquid which is injected into said formation at one continuous injection being between about 2 percent of the hydrocarbon pore volume of the formation and at least twice the displacement of that portion of the bore of said injection well which traverses the formation;
    (d) alternately repeating steps (b) and (c); and
    (e) injecting into said injection well a drive fluid sufficient to drive the oil through said formation and thereafter through a producing well.

10. A process as defined in claim 9 wherein said initially injected fluid is liquified petroleum gas and said second injected fluid is a gas which is miscible with said liquified petroleum gas and immiscible in the hydrocarbons naturally occurring in the formation.

References Cited by the Examiner

UNITED STATES PATENTS

| | | | |
|---|---|---|---|
| 2,742,089 | 4/1956 | Morse | 166—9 |
| 2,798,556 | 7/1957 | Binder | 166—9 |
| 2,927,637 | 3/1960 | Draper | 166—9 |
| 3,080,917 | 3/1963 | Walker | 166—9 |
| 3,096,821 | 7/1963 | Dyes | 166—9 |
| 3,186,482 | 6/1965 | Bond | 166—9 |

CHARLES E. O'CONNELL, *Primary Examiner.*

JACOB L. NACKENOFF, *Examiner.*

C. H. GOLD, S. J. NOVOSAD, *Assistant Examiners.*